US011860376B2

United States Patent
Kim et al.

(10) Patent No.: US 11,860,376 B2
(45) Date of Patent: Jan. 2, 2024

(54) POLARIZATION DECOMPOSITION DEVICE

(71) Applicant: ELECTRONICS AND TELECOMMUNICATIONS RESEARCH INSTITUTE, Daejeon (KR)

(72) Inventors: Kap-Joong Kim, Daejeon (KR); Chun Ju Youn, Daejeon (KR); Heasin Ko, Daejeon (KR); Byung-Seok Choi, Sejong (KR); Joong-Seon Choe, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1237 days.

(21) Appl. No.: 16/415,708

(22) Filed: May 17, 2019

(65) Prior Publication Data

US 2019/0353918 A1 Nov. 21, 2019

(30) Foreign Application Priority Data

May 18, 2018 (KR) .......................... 10-2018-0057350

(51) Int. Cl.
*G02B 27/28* (2006.01)
*H04K 1/08* (2006.01)

(52) U.S. Cl.
CPC .......... *G02B 27/283* (2013.01); *G02B 27/286* (2013.01); *H04K 1/08* (2013.01)

(58) Field of Classification Search
CPC ................ G02B 27/283; G02B 27/286; G02B 6/29302; G02B 26/06; H04K 1/08

USPC .................................................... 359/498.08
See application file for complete search history.

(56) References Cited

U.S. PATENT DOCUMENTS 6,266,458 B1  7/2001  Ahn et al.
7,860,394 B2  12/2010  Hoshida
9,547,131 B1  1/2017  Lin
(Continued)

FOREIGN PATENT DOCUMENTS

JP          4975385 B2    7/2012

OTHER PUBLICATIONS

Polarization-Insensitive Operation of Lithium Niobate Mach-Zehnder Interferometer With Silica PLC-Based Polarization Diversity Circuit; Kenya Suzuki et al.; IEEE Photonics Technology Letters; vol. 20, No. 10; May 15, 2008.

*Primary Examiner* — Balram T Parbadia
*Assistant Examiner* — Rahman Abdur

(57) ABSTRACT

Provided is a polarization decomposition device. The polarization decomposition device includes a polarization beam splitter configured to split an optical signal into a first polarized light having a first polarization direction and a second polarized light having a second polarization direction different from the first polarized light, a phase shifter configured to delay a phase of the first polarized light, a polarization rotator configured to rotate the second polarized light so that the polarization direction of the second polarized light is changed, and an interference beam splitter configured to allow the first polarized light in which the phase is delayed and the second polarized light in which the polarization direction is rotated to interfere with each other and split them into a third polarized light and a fourth polarized light.

22 Claims, 6 Drawing Sheets

(56) References Cited

U.S. PATENT DOCUMENTS

2012/0163751 A1    6/2012   Cho et al.
2016/0047643 A1*   2/2016   Yuan .................... H01S 5/4006
                                                                                398/25

* cited by examiner

POLARIZATION DECOMPOSITION DEVICE

CROSS-REFERENCE TO RELATED APPLICATIONS

This U.S. non-provisional patent application claims priority under 35 U.S.C. § 119 of Korean Patent Application No. 10-2018-0057350, filed on May 18, 2018, the entire contents of which are hereby incorporated by reference.

BACKGROUND

The present disclosure herein relates to a device for optical communication, and more particularly to a polarization decomposition device.

Optical communication means a communication method that uses optical waves generated from various light sources as carrier waves. Optical communication may be performed by converting an electrical signal including transmission information into an optical signal, transmitting the optical signal, and converting the received optical signal into an electrical signal. Such optical communication may be performed by transmitting the optical signal to free space or waveguide. The waveguide totally reflects the optical signal, and the optical signal is transmitted based on this total reflection. Optical communication has less loss than conventional communication methods, and has advantages of wide bandwidth and high speed communication.

Devices that split or combine polarized light are widely used in optical communication devices. A device for decomposing or composing polarizations of light is used for various communication devices such as a polarized light diversity receiver, an optical circulator, or a polarized light mode disperser. A polarization decomposition device may split an optical signal into two polarized lights that are orthogonal to each other, and a polarized light coupling device may combine two polarized lights orthogonal to each other into one optical signal.

Recently, a quantum cryptographic communication device for obtaining the security of communication has received attention. The quantum cryptographic communication is a communication using quantum mechanical properties, and may encrypt information using the polarization direction of the optical signal. To detect or generate this polarization direction, a quantum cryptographic communication device may include a device for decomposing or composing polarizations of light. In order to obtain security, quantum cryptography communication may be performed using more than two polarization directions. Accordingly, there is a need for a device that splits or combines polarized light having various polarization directions.

SUMMARY

The present disclosure is to provide a polarization decomposition device that may be miniaturized or integrated and may ensure ease of fabrication and stability of operation.

An embodiment of the inventive concept provides a polarization decomposition device including a polarization beam splitter, a phase shifter, a polarization rotator, and an interference beam splitter. The polarization beam splitter splits the optical signal into a first polarized light having a first polarization direction and a second polarized light having a second polarization direction. The phase shifter may delay the phase of the first polarized light. The phase shifter may determine the retarded phase angle of the first polarized light. The polarization rotator may rotate the polarization direction of the second polarized light. The polarization rotator may rotate the polarization direction of the second polarized light so that the polarization direction of the second polarized light has a polarization direction of the first polarized light. The interference beam splitter allows the phase-delayed first polarized light and the second polarized light whose polarization direction is rotated to interfere with each other so that the optical signal having the third polarization direction may be split into the third polarized light and the optical signal having the fourth polarization direction may be split into the fourth polarized light.

The first polarization direction and the second polarization direction may be orthogonal to each other, and the third polarization direction and the fourth polarization direction may be orthogonal to each other. Splitting into a third polarized light and splitting into a fourth polarized light may be determined based on the phase angle delayed by the phase shifter. The third polarization direction may be 45 degrees clockwise from the first polarization direction with respect to the propagation direction of the first polarized light, and the fourth polarization direction may be 45 degrees counterclockwise from the first polarization direction with respect to the propagation direction of the first polarized light. Alternatively, the third polarization direction may be a left circular polarization direction that rotates clockwise with respect to the propagation direction of the first polarized light, and the fourth polarization direction may be a right circular polarization direction that rotates counterclockwise with respect to the propagation direction of the first polarized light.

An embodiment of the inventive concept provides a polarization decomposition device including a polarization beam splitter, a phase shifter, a polarization rotator, and an interference beam splitter. The polarization beam splitter splits the optical signal into a first polarized light having a first polarization direction and a second polarized light having a second polarization direction. The phase shifter may delay the phase of the second polarized light. The polarization rotator may rotate the polarization direction of the second polarized light. The interference beam splitter allows the first polarized light and the second polarized light whose phase is delayed and polarization direction is rotated to interfere with each other so that the optical signal having the third polarization direction may be split into the third polarized light and the optical signal having the fourth polarization direction may be split into the fourth polarized light. For example, a polarization rotator may rotate a phase-retarded second polarized light. For example, a phase shifter may delay the phase of a second polarized light whose polarization direction is rotated.

An embodiment of the inventive concept provides a polarization decomposition device including a beam splitter unit, a phase shifter, a polarization rotator, and an interference beam splitter. The beam splitter unit may split the optical signal into a first polarized light having a first polarization direction, a first split polarized light having a first polarization direction, a second polarized light having a second polarization direction, and a second split polarized light having a second polarization direction.

For example, a beam splitter unit may include a beam splitter for splitting the optical signal into a first optical signal and a second optical signal, a first polarization beam splitter for splitting the first optical signal into first and second polarized lights, and a second polarization beam splitter for splitting the second optical signal into first and second split polarized lights.

The phase shifter may delay the phase of the first split polarized light or the second split polarized light. The polarization rotator may rotate the polarization direction of the first split polarized light or the second split polarized light. The interference beam splitter may split the optical signal having the third polarization direction into the third polarized light and the optical signal having the fourth polarization direction into the fourth polarized light based on the first or second split polarized light whose phase is delayed or polarization direction is rotated.

For example, the polarization decomposition device may further include a second phase shifter, a second polarization rotator, and a second interference beam splitter. The second phase shifter may delay the phase of the first polarized light or the second polarized light. The second polarization rotator may rotate the polarization direction of the first polarized light or the second polarized light. The second interference beam splitter may split the optical signal having the fifth polarization direction into a fifth polarized light and the optical signal having the sixth polarization direction into a sixth polarized light based on the first or second polarized light whose phase is delayed or polarization direction is rotated.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

In the following, embodiments of the inventive concept will be described in detail so that those skilled in the art easily carry out the inventive concept. Below, a device is disclosed in which polarized light having various polarization directions may be split or combined. However, the following devices are collectively referred to as a polarization decomposition device for convenience of explanation. The polarization decomposition device may perform the function of a polarized light coupling device according to the input direction of the optical signal. For example, when an optical signal is inputted to an output port of a polarization decomposition device according to an embodiment to be described later, and an optical signal is outputted to an input port of a polarization decomposition device, the function of the polarized light coupling device is performed.

Figure 1:
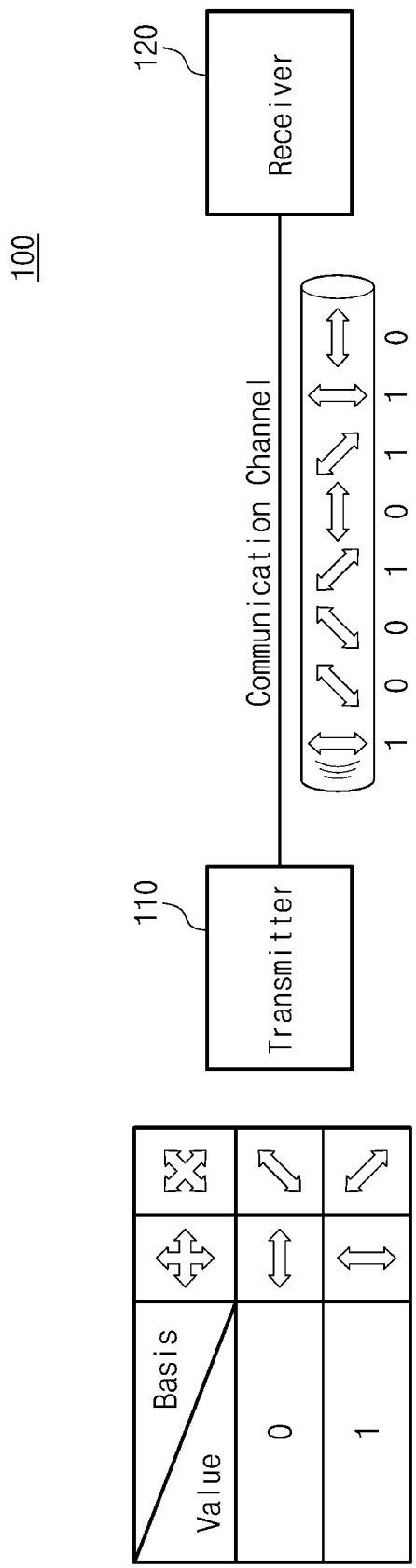
FIG. 1 is a diagram for explaining a quantum cryptography communication system to which the inventive concept may be applied.

FIG. 1 is a view for explaining a quantum cryptography communication system to which the inventive concept may be applied. Referring to FIG. 1, a quantum cryptography communication system 100 includes a transmitter 110 and a receiver 120. The transmitter 110 and the receiver 120 may communicate through a communication channel. The quantum cryptography communication system 100 will be understood as one embodiment in which a polarization decomposition device according to an embodiment of the inventive concept is applied.

The transmitter 110 transmits an optical signal generated from a light source (not shown) to the receiver 120 through a communication channel. The transmitter 110 may generate an optical signal including transmission information based on four polarized lights forming two bases. The first base may be divided into 0-degree polarized light and 90 degree polarized light, and the second base may be divided into 45 degree polarized light and −45 degree polarized light. The 0 degree polarized light component in the transmitted optical signal may correspond to a bit value of 0 according to the first basis and the 90 degree polarized light component may correspond to a bit value of 1 according to the first basis. In addition, the 45 degree polarized light component may correspond to a bit value of 0 according to the second basis and the −45 degree polarized light component may correspond to a bit value of 1 according to the second basis. The transmitter 110 may combine polarized lights having various polarized light components and output the combined light.

The receiver 120 receives the optical signal transmitted through the communication channel. The receiver 120 may interpret the optical signal based on the first and second bases. For this, the receiver 120 may split the optical signal in which the various polarized lights are combined into four polarized lights and detect them. The receiver 120 may split the optical signal into 0 degree polarized light, 90 degree polarized light, 45 degree polarized light, and −45 degree polarized light. The receiver 120 may interpret the 0 degree polarized light component and the 90 degree polarized light component based on the first basis and the 45 degree polarized light component and the −45 degree polarized light component based on the second basis.

For example, the transmitter 110 may select one basis from among the first and second bases, and transmit the optical signal of the polarized light corresponding to the value of 0 or 1 to the receiver 120 through the communication channel based on the selected base. The receiver 120 may select one of the bases of the first and second bases and may detect the polarized light included in the optical signal based on the selected basis. Thereafter, the base selected by each of the transmitter 110 and the receiver 120 may be disclosed to each other, and the quantum cryptography may be generated based on the bit value when the same basis is selected. That is, in order to perform such a quantum cryptographic communication, four polarized lights with two bases may be required.

Figure 2:
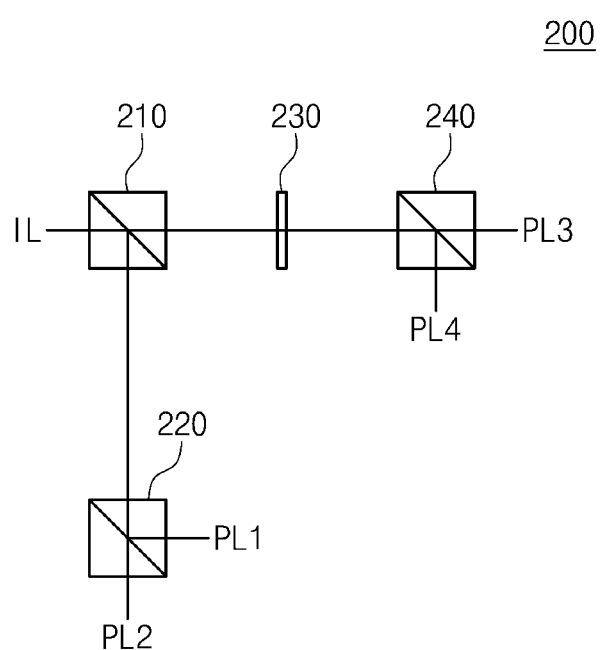
FIG. 2 is a view illustrating a polarization decomposition device according to an embodiment.

FIG. 2 is a view illustrating a polarization decomposition device according to an embodiment. Referring to FIG. 2, the polarization decomposition device 200 includes a beam splitter 210, a first polarization beam splitter 220, a wave plate 230, and a second polarization beam splitter 240. The polarization decomposition device 200 of FIG. 2 may be implemented on an optical table.

The beam splitter 210 may split the optical signal IL into a first optical signal and a second optical signal. The first optical signal and the second optical signal may have the same polarized light component. For example, the beam splitter 210 may include a semi-transparent mirror. The first optical signal, which is a part of the input optical signal IL, may be reflected by the beam splitter 210 and then propagate to the first polarization beam splitter 220. The second optical signal, which is a remaining part of the input optical signal IL, may be transmitted through the beam splitter 210 and then propagate to the wave plate 230.

The first polarization beam splitter 220 splits the first optical signal into a first polarized light PL1 and a second polarized light PL2. The first polarization direction may be split into the first polarized light PL1 and the second polarization direction may be split into the second polarized light PL2. The first polarization direction and the second polarization direction may be orthogonal to each other. For example, the first polarization direction may be 0 degrees and the second polarization direction may be 90 degrees. The first polarized light PL1 and the second polarized light PL2 are split by different paths.

The wave plate 230 may change the polarization direction of the second optical signal. The wave plate 230 may rotate the polarization direction of the second optical signal by 45 degrees. For example, the polarized light component having the polarization direction of 0 degrees in the second optical signal may be rotated to have the polarization direction of 45 degrees, and the polarized light component having the polarization direction of 90 degrees may be rotated to have the polarization direction of −45 degrees. The wave plate 230 may be a half wave plate (HWP).

The second polarization beam splitter 240 splits the second optical signal whose polarization direction is rotated into a third polarized light PL3 and a fourth polarized light PL4. The second polarization beam splitter 240 may be substantially the same configuration as the first polarization beam splitter 220. The third polarization direction may be split into the third polarized light PL3 and the fourth polarization direction may be split into the fourth polarized light PL4. The third polarization direction and the fourth polarization direction may be orthogonal to each other. For example, the third polarization direction may be −45 degrees and the fourth polarization direction may be 45 degrees. The third polarized light PL3 and the fourth polarized light PL4 may be split and propagated in different paths. For example, a polarized light component having a polarization direction of −45 degrees of the second optical signal is rotated through the wave plate 230 to have a polarization direction of 90 degrees. The second polarization beam splitter 240 splits the polarized light component having the polarization direction of substantially 0 degrees from the polarized light component having the polarization direction of 90 degrees so that the polarized light component rotated in the polarization direction of 90 degrees is split into the third polarized light PL3. That is, the polarized light component having the polarization direction of −45 degrees of the second optical signal is spit into the third polarized light PL3.

The polarization decomposition device 200 may split the optical signal IL having four different polarization directions into the first to fourth polarized lights PL1 to PL4. If the components included in the polarization decomposition device 200 of FIG. 2 are implemented on an optical table, a large space is required and alignment between the light source and each component is required. That is, the polarization decomposition device of FIG. 2 may cause an error according to misalignment. Also, when the polarization decomposition device 200 is applied to an optical waveguide, an additional process for forming the wave plate 230 included in the polarization decomposition device 200 in the optical waveguide may be required. In addition, the wave plate 230 may cause a loss of the optical signal in progress.

To complement this, a polarization rotator may be used instead of the wave plate 230, but a polarization rotator that rotates the polarization direction by 45 degrees is not common.

Figure 3:
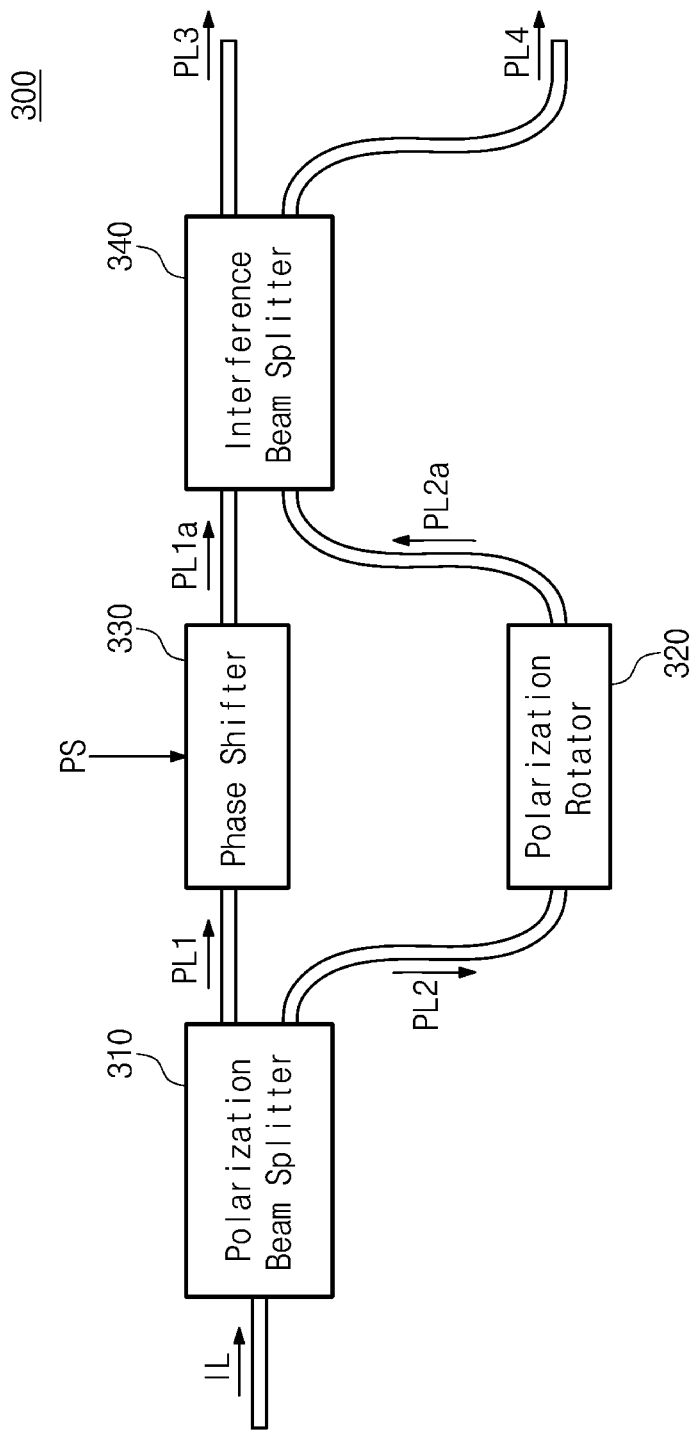
FIG. 3 is a view illustrating a polarization decomposition device according to an embodiment of the inventive concept.

FIG. 3 is a view illustrating a polarization decomposition device according to an embodiment of the inventive concept. Referring to FIG. 3, a polarization decomposition device 300 includes a polarization beam splitter 310, a polarization rotator 320, a phase shifter 330, and an interference beam splitter 340. The polarization decomposition device 300 may be implemented on the basis of an optical waveguide, and may advance the optical signal using an optical waveguide.

The polarization beam splitter 310 splits the optical signal IL into a first polarized light PL1 and a second polarized light PL2. The optical signal IL having the first polarization direction may be split into the first polarized light PL1 and the optical signal IL having the second polarization direction may be split into the second polarized light PL2. The first polarization direction and the second polarization direction may be orthogonal to each other. The first polarization direction may be 0 degrees and the second polarization direction may be 90 degrees. The first polarized light PL1 may propagate to the phase shifter 330 and the second polarized light PL2 may propagate to the polarization rotator 320.

The polarization rotator 320 rotates the polarization direction of the second polarized light PL2. The polarization rotator 320 may rotate the polarization direction of the second polarized light PL2 by 90 degrees. Since the polarization direction of the second polarized light PL2 is rotated by 90 degrees, when the second polarization direction is 90 degrees, the polarization direction of the second polarized light PL2a whose polarization direction is rotated may be 180 degrees (0 degrees). That is, the polarization rotator 320 may rotate the second polarized light PL2 such that the polarization direction of the second polarized light PL2 is the first polarization direction. The second polarized light PL2a whose polarization direction is rotated propagates to the interference beam splitter 340.

The phase shifter 330 delays the phase of the first polarized light PL1. The phase shifter 330 may determine the phase angle to be delayed considering the splitting of the third polarization direction and the fourth polarization direction. For example, when the polarization decomposition device 300 finally splits the optical signal IL having the −45 degree polarized light and the 45 degree polarization direction into the third polarized light PL3 and the fourth polarized light PL4 but does not consider the delay due to the optical path, the phase shifter 330 may delay the phase of the first polarized light PL1 so that a phase difference of 90 degrees (or −90 degrees) with the second polarized light PL2a whose polarization direction is rotated is generated. In addition, when the polarization decomposition device 300 finally splits the optical signal IL having the left circular polarized light and right circular polarization direction into the third polarized light PL3 and the fourth polarized light PL4 but does not consider the delay due to the optical path, the phase shifter 330 may delay the phase of the first polarized light PL1 so that a phase difference of 90 degrees (or −90 degrees) with the second polarized light PL2a whose polarization direction is rotated is generated. The phase-delayed first polarized light PL1a propagates to the interference beam splitter 340.

The phase delay of the phase shifter 330 may compensate for the phase difference due to the difference between the propagation paths of the first and second polarized lights PL1 and PL2. For example, a phase difference, according to a difference between a path through which the first polarized light PL1 propagates from the polarization beam splitter 310 to the phase shifter 330, a path where the phase-delayed first polarized light PL1a propagates from the phase shifter 330 to the interference beam splitter 340, and a path between the first polarized light PL1a whose phase is delayed in the interference beam splitter 340 and the second polarized light PL2a whose polarization direction is rotated, may be considered in the phase delay. Also, a phase difference, according to a difference between a path through which the second polarized light PL2 propagates from the polarization beam splitter 310 to the polarization rotator 320, a path through which the second polarized light PL2a rotated in the polarization direction is transmitted from the polarization rotator 320 to the interference beam splitter 340, and a path between the second polarized light PL2a whose polarization direction is rotated inside the interference beam splitter 340 and the first polarized light PL1a whose phase is delayed, may be considered in the phase delay. In addition, the phase of the first polarized light PL1 may be delayed in consideration of various factors that may cause the phase difference.

The phase shifter 330 may determine the phase angle of the first polarized light PL1 to be delayed based on the phase delay signal PS. Based on the phase delay signal PS, the phase shifter 330 may determine the type of polarized light to be split by the polarization decomposition device 300. For example, based on the phase delay signal PS, the optical signal IL having the polarization direction of −45 degrees may be split into the third polarized light PL3 and the optical signal IL having the polarization direction of 45 degrees may be split into the fourth polarized light PL4. Alternatively, based on the phase delay signal PS, the optical signal IL having the left circular polarization direction in which the polarization direction rotates clockwise with respect to the propagation direction is split into the third polarized light PL3, and the optical signal IL having the right circular polarization direction in which the polarization direction is rotated counterclockwise with respect to the propagation direction may be split into the fourth polarized light PL4. However, the inventive concept is not limited thereto, and the optical signal IL having two elliptical polarized lights perpendicular to each other may be split into the third polarized light PL3 and the fourth polarized light PL4 based on the phase delay signal PS. That is, the phase shifter 330 may perform the function of finally splitting the polarization direction based on the phase delay signal PS. The phase shifter 330 may determine the polarization direction split according to the phase delay signal PS.

Unlike what is shown in FIG. 3, the polarization decomposition device 300 may be designed such that the phase of the first polarized light PL1 is delayed by using the length of the waveguide or the like without a separate phase shifter. That is, the polarization decomposition device 300 may determine the phase angle of the first polarized light PL1 to be delayed using the length of the waveguide.

The interference beam splitter 340 may allow the first polarized light PL1a whose phase is delayed to interfere with the second polarized light PL2a whose polarization direction is rotated. The polarization direction of the second polarized light PL2 is rotated by the polarization rotator 320 so that it has the same polarization direction as the first polarized light PL1. The phase of the first polarized light PL1 is delayed by the phase shifter 330 so that it may be split in the polarization direction to be determined upon interference with the second polarized light PL2a whose polarization direction is rotated. The first polarized light PL1a whose phase is delayed and the second polarized light PL2a whose polarization direction is rotated are interfered by the interference beam splitter 340. As a result, the optical signal IL having the third polarization direction is split into the third polarized light PL3 and the optical signal IL having the fourth polarization direction is split into the fourth polarized light PL4.

The third polarization direction and the fourth polarization direction may be orthogonal to each other. The third polarization direction may be 45 degrees clockwise from the first polarization direction with respect to the propagation direction of the first polarized light PL1, and the fourth polarization direction may be 45 degrees counterclockwise from the first polarization direction with respect to the propagation direction of the first polarized light PL1. Alternatively, the third polarization direction rotates clockwise with respect to the propagation direction of the first polarized light PL1, and the fourth polarization direction rotates counterclockwise with respect to the propagation direction of the first polarized light PL1. That is, the third polarized light PL3 may be in the left circular polarization direction and the fourth polarized light PL4 may be in the right circular polarization direction. However, the inventive concept is not limited thereto, and the third polarization direction and the fourth polarization direction may be two elliptical polarization directions perpendicular to each other. As a result, the polarization decomposition device 300 may split the optical signal IL having two polarization directions perpendicular to each other into different polarized light.

When the polarization direction of the optical signal IL is −45 degrees and 45 degrees, the operation of the polarization decomposition device 300 is described. All 0 degree polarized light components included in the optical signal IL are split into a first polarized light PL1 by a polarization beam splitter 310. The phase of the first polarized light PL1 is delayed by the phase shifter 330, and the interference beam splitter 340 splits the 0 degree polarized light component into the third polarized light PL3 and the fourth polarized light PL4. A phase difference of 90 degrees (or −90 degrees) may occur between the split third polarized light PL3 and fourth polarized light PL4. When only the 0 degree polarized light component exists in the optical signal IL, since the second polarized light PL2 is not present, interference between the first polarized light PL1 and the second polarized light PL2 may not be performed.

All 90 degrees polarized light components included in the optical signal IL are split into a second polarized light PL2 by a polarization beam splitter 310. The polarization rotator 320 rotates the second polarized light PL2 by 90 degrees, and the interference beam splitter 340 splits the second polarized light PL2a rotated by 90 degrees into the third polarized light PL3 and the fourth polarized light PL4. A phase difference of −90 degrees (or 90 degrees) may occur between the split third polarized light PL3 and fourth polarized light PL4. When only the 90 degree polarized light component exists in the optical signal IL, since the first polarized light PL1 is not present, interference between the first polarized light PL1 and the second polarized light PL2 may not be performed.

The −45 degree polarized light component included in the optical signal IL is split into the 0 degree polarized light component and the 90 degree polarized light component by the polarization beam splitter 310. The 0 degree polarized light component is split into the first polarized light PL1 and the 90 degree polarized light component is split into the second polarized light PL2. The respective magnitudes of the split 0 degree polarized light component and 90 degree polarized light component may be the same. The phase of the first polarized light PL1 is delayed and the second polarized light PL2 is rotated by 90 degrees. The polarization directions of the two polarized lights propagating to the interference beam splitter 340 may be the same. The interference beam splitter 340 allows the phase-delayed first polarized light PL1a to constructively interfere with the second polarized light PL2a rotated by 90 degrees by a 0 degree phase difference to split them into the third polarized light PL3. The interference beam splitter 340 allows the phase-delayed first polarized light PL1a to constructively interfere with the second polarized light PL2a rotated by 90 degrees by a 180 degree phase difference to split them into the fourth polarized light PL4. No fourth polarized light PL4 appears due to destructive interference.

The 45 degree polarized light component included in the optical signal IL is split into the 0 degree polarized light component and the 90 degree polarized light component by the polarization beam splitter 310. The 0 degree polarized light component is slit into the first polarized light PL1 and the 90 degree polarized light component is split into the second polarized light PL2. The respective magnitudes of the split 0 degree polarized light component and 90 degree polarized light component may be the same. The phase of the first polarized light PL1 is delayed and the second polarized light PL2 is rotated by 90 degrees. The polarization directions of the two polarized lights propagating to the interference beam splitter 340 may be the same. The interference beam splitter 340 allows the phase-delayed first polarized light PL1a to constructively interfere with the second polarized light PL2a rotated by 90 degrees by a 0 degree phase difference and splits them into the fourth polarized light PL3. The interference beam splitter 340 allows the phase-delayed first polarized light PL1a to constructively interfere with the second polarized light PL2a rotated by 90 degrees by a 180 degree phase difference to split them into the third polarized light PL2. No third polarized light PL3 appears due to destructive interference.

The interference beam splitter 340 may split the optical signal IL having the left circular polarization direction into the third polarized light PL3 and the optical signal IL having the right circular polarization direction into the fourth polarized light PL4 depending on the phase angle delayed by phase shifter 330. For example, the left circular polarization direction of the optical signal IL may be split into the third polarized light PL3, and the right circular polarization direction of the optical signal IL may be split into the fourth polarized light PL4. In this case, the phase shifter 330 adds −90 degrees (or 90 degrees) to the phase angle delayed when the −45 degree polarization direction is split into the third polarized light PL3 and the 45 degree polarization direction is split into the fourth polarized light PL4, so that it is possible to split the optical signal IL having the left circular polarization direction and the right circular polarization direction.

The polarization decomposition device 300 may combine the third and fourth polarized lights PL3 and PL4 propagating to the interference beam splitter 340. In this case, the interference beam splitter 340 may split the third polarized light PL3 and the fourth polarized light PL4 into two polarized lights having the same polarization direction and having different phases. One of the polarized lights is phase-adjusted by the phase shifter 330, and the other polarized light is rotated by the polarization rotator 320. The polarization beam splitter 310 may combine these two polarized lights into an optical signal IL.

Figure 4:
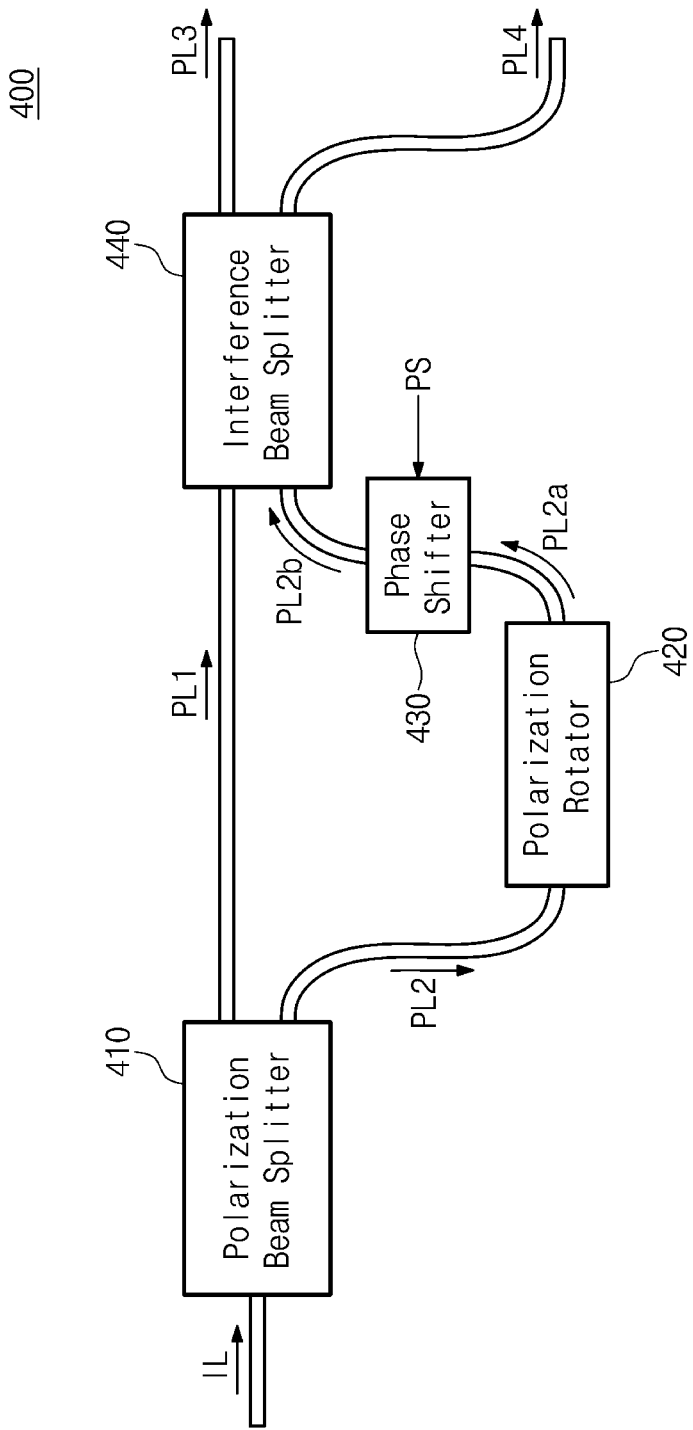
FIG. 4 is a view illustrating a polarization decomposition device according to another embodiment of the inventive concept.

FIG. 4 is a view illustrating a polarization decomposition device 400 according to another embodiment of the inventive concept. Referring to FIG. 4, a polarization decomposition device 400 includes a polarization beam splitter 410, a polarization rotator 420, a phase shifter 430, and an interference beam splitter 440. Compared with FIG. 3, the phase shifter 430 of the polarization decomposition device 400 of FIG. 4 delays the phase of the second polarized light PL2a whose polarization direction is rotated instead of the first polarized light PL1. The internal configuration of the polarization beam splitter 410, the polarization rotator 420, the phase shifter 430, and the interference beam splitter 440 may be substantially the same as that of the polarization beam splitter 310, the polarization rotator 320, the phase shifter 330, and the interference beam splitter 340 of FIG. 3.

The polarization beam splitter 410 splits the optical signal IL having different polarization directions into a first polarized light PL1 and a second polarized light PL2. The first polarized light PL1 propagates to the interference beam splitter 440. The second polarized light PL2 propagates to the polarization rotator 420. The polarization rotator 420 may rotate the second polarized light PL2 such that the polarization direction of the second polarized light PL2 corresponds to the polarization direction of the first polarized light PL1. The second polarized light PL2a whose polarization direction is rotated propagates to the phase shifter 430.

The phase shifter 430 delays the phase of the second polarized light PL2a whose polarization direction is rotated based on the phase delay signal PS. Compared with FIG. 3, the phase angle delayed by the phase shifter 430 may have a phase angle opposite to the phase angle delayed by the phase shifter 430 in FIG. 3. However, the inventive concept is not limited thereto, and various factors such as the optical path and the like may be considered and the phase angle may be determined. The second polarized light PL2b delayed by the phase shifter 430 propagates to the interference beam splitter 440. The optical signal IL is split into the third polarized light PL3 and the fourth polarized light PL4 by the interference beam splitter 440.

Unlike FIG. 4, the phase shifter 430 may first delay the phase of the second polarized light PL2, and the polarization rotator 420 may rotate the delayed second polarized light PL2. Also, unlike the interference beam splitter 340 of FIG. 3, if another polarization direction interference beam splitter 440 is used, the polarization rotator 420 and the phase shifter 430 may be disposed between the polarization beam splitter 410 and the interference beam splitter 440 in various manners. For example, unlike FIG. 3 or FIG. 4, the polarization rotator may be arranged to rotate the first polarized light PL1. In this case, in order to realize the effect as shown in FIG. 3 or FIG. 4, the angle at which the polarization rotator rotates the first polarized light PL1 may have an angle opposite to the angle at which the second polarized light PL2 is rotated. In addition, unlike FIG. 4, the polarization rotator 420 and the phase shifter 430 may be arranged to rotate the first polarized light PL1 and to delay the phase of the first polarized light PL1.

Unlike what is shown in FIG. 4, the polarization decomposition device 400 may be designed such that the phase of the second polarized light PL2 is delayed by using the length of the waveguide or the like without a separate phase shifter. That is, the polarization decomposition device 400 may determine the phase angle at which the second polarized light PL2 is delayed using the length of the waveguide.

Figure 5:
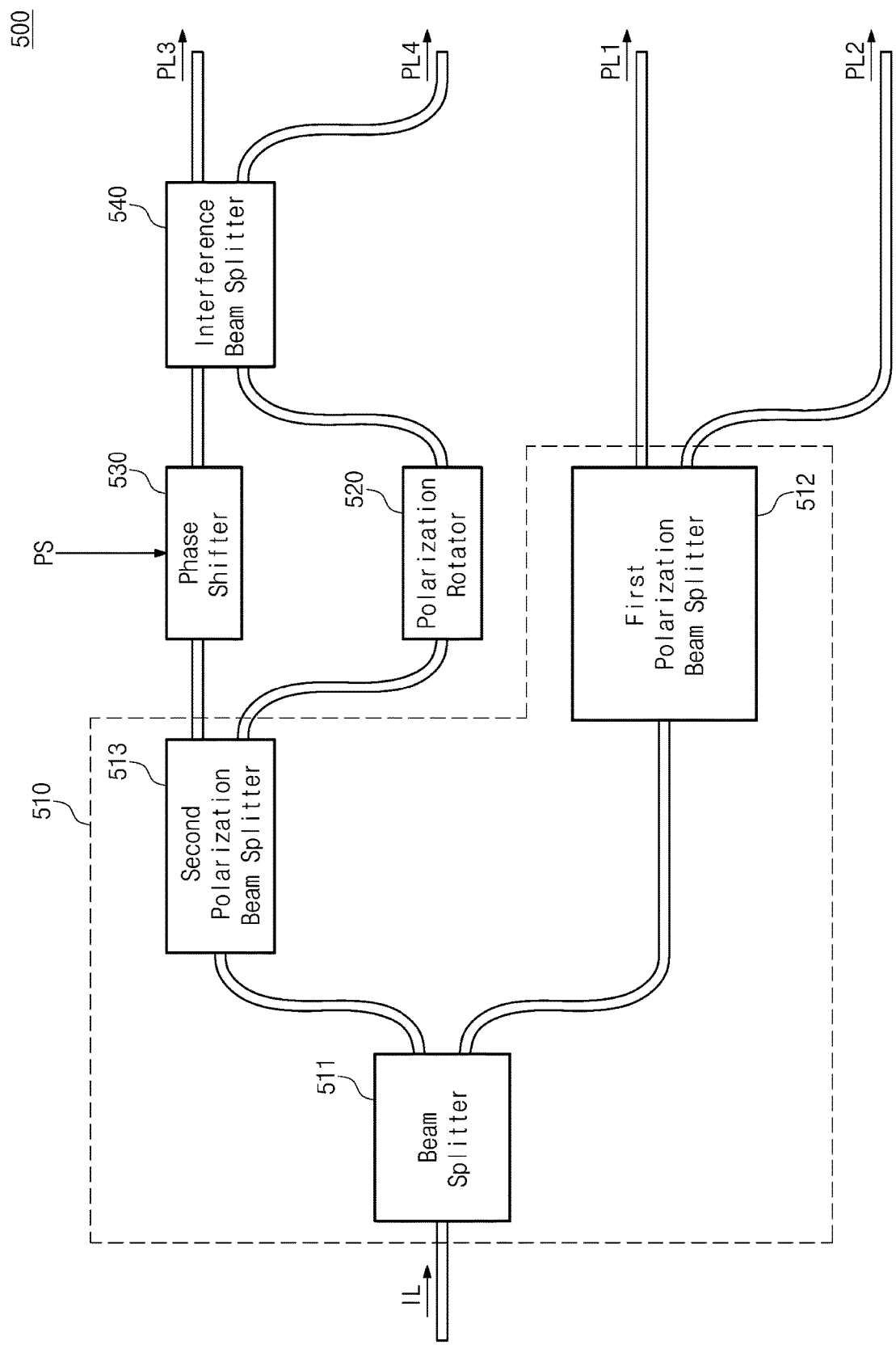
FIG. 5 is a view illustrating a polarization decomposition device for splitting four different polarization directions according to an embodiment of the inventive concept.

FIG. 5 is a view illustrating a polarization decomposition device for splitting four different polarization directions according to an embodiment of the inventive concept. Referring to FIG. 5, a polarization decomposition device 500 includes a beam splitter unit 510, a polarization rotator 520, a phase shifter 530, and an interference beam splitter 540. The polarization decomposition device 500 may split the optical signal IL into different first to fourth polarized lights PL1 to PL4. The polarization rotator 520, the phase shifter 530, and the interference beam splitter 540 are substantially the same as the polarization rotator 320, the phase shifter 330 and the interference beam splitter 340 of FIG. 3, so that their detailed descriptions are omitted. In addition, as shown in FIG. 3, the linear polarized light of each of −45 degrees and 45 degrees, or the left circular polarized light and the right circular polarized light may be split into the third polarized light PL3 and the fourth polarized light PL4.

The beam splitter unit 510 includes a beam splitter 511, a first polarization beam splitter 512, and a second polarization beam splitter 513. The beam splitter 511 may split the optical signal IL into a first optical signal and a second optical signal. The first optical signal and the second optical signal may have the same polarized light component. The first optical signal propagates to a first polarization beam splitter 512 and the second optical signal propagates to a second polarization beam splitter 513.

The first polarization beam splitter 512 splits the first optical signal into a first polarized light PL1 and a second polarized light PL2. The first polarization direction of the first optical signal may be split into the first polarized light PL1 and the second polarization direction of the first optical signal may be split into the second polarized light PL2. The first polarization direction and the second polarization direction may be orthogonal to each other. For example, the first polarization direction may be 0 degrees and the second polarization direction may be 90 degrees.

The second polarization beam splitter 513 splits the second optical signal into a first split polarized light and a second split polarized light. The second polarization beam splitter 513 may be substantially the same configuration as the first polarization beam splitter 512. The first polarization direction of the second optical signal may be split into the first split polarized light and the second polarization direction of the second optical signal may be split into the second split polarized light. The first split polarized light may have the same polarization direction as the first polarized light PL1 and the second split polarized light may have the same polarization direction as the second polarized light PL2. The first split polarized light may propagate to the phase shifter 530 and the second split polarized light may propagate to the polarization rotator 520. As in FIG. 3, the interference beam splitter 540 may allow the first split polarized light whose phase is delayed to interfere with the second split polarized light whose the polarization direction is rotated, so that the third polarization direction of the second optical signal may be split into the third polarized light PL3, and the fourth polarization direction of the second optical signal may be split into the fourth polarized light PL4.

The two polarized lights of the first base orthogonal to each other may be split into the first polarized light PL1 and the second polarized light PL2 and the two polarized lights of the second base orthogonal to each other may be split into the third polarized light PL3 and the fourth polarized light PL4. Since the polarization decomposition device 500 of FIG. 5 does not split polarized light using a wave plate, the loss due to the polarized light splitting may be minimized, and the optical waveguide may be implemented on the basis of the optical alignment, which may be miniaturized and integrated. Also, the polarization decomposition device 500 does not split the specific polarization direction into the third polarized light PL3 and the fourth polarized light PL4 using the phase delay signal PS, and may adjust various polarization directions to be split. Unlike what is shown in FIG. 5, if the polarization decomposition device 500 is designed such that the phase difference between the two polarized lights inputted to the interference beam splitter 540 is 90 degrees (or −90 degrees) using the length of the waveguide, the phase shifter 530 may not be included in the polarization decomposition device 500.

The polarization decomposition device 500 may combine the first to fourth polarized lights PL1 to PL4 into the optical signal IL. The first polarization beam splitter 512 splits the first optical signal into a first polarized light PL1 and a second polarized light PL2. The second polarization beam splitter 513, the polarization rotator 520, the phase shifter 530 and the interference beam splitter 540 combine the third polarized light PL3 and the fourth polarized light PL4 into a second optical signal. The beam splitter 511 may combine the first and second optical signals into the optical signal IL.

Figure 6:
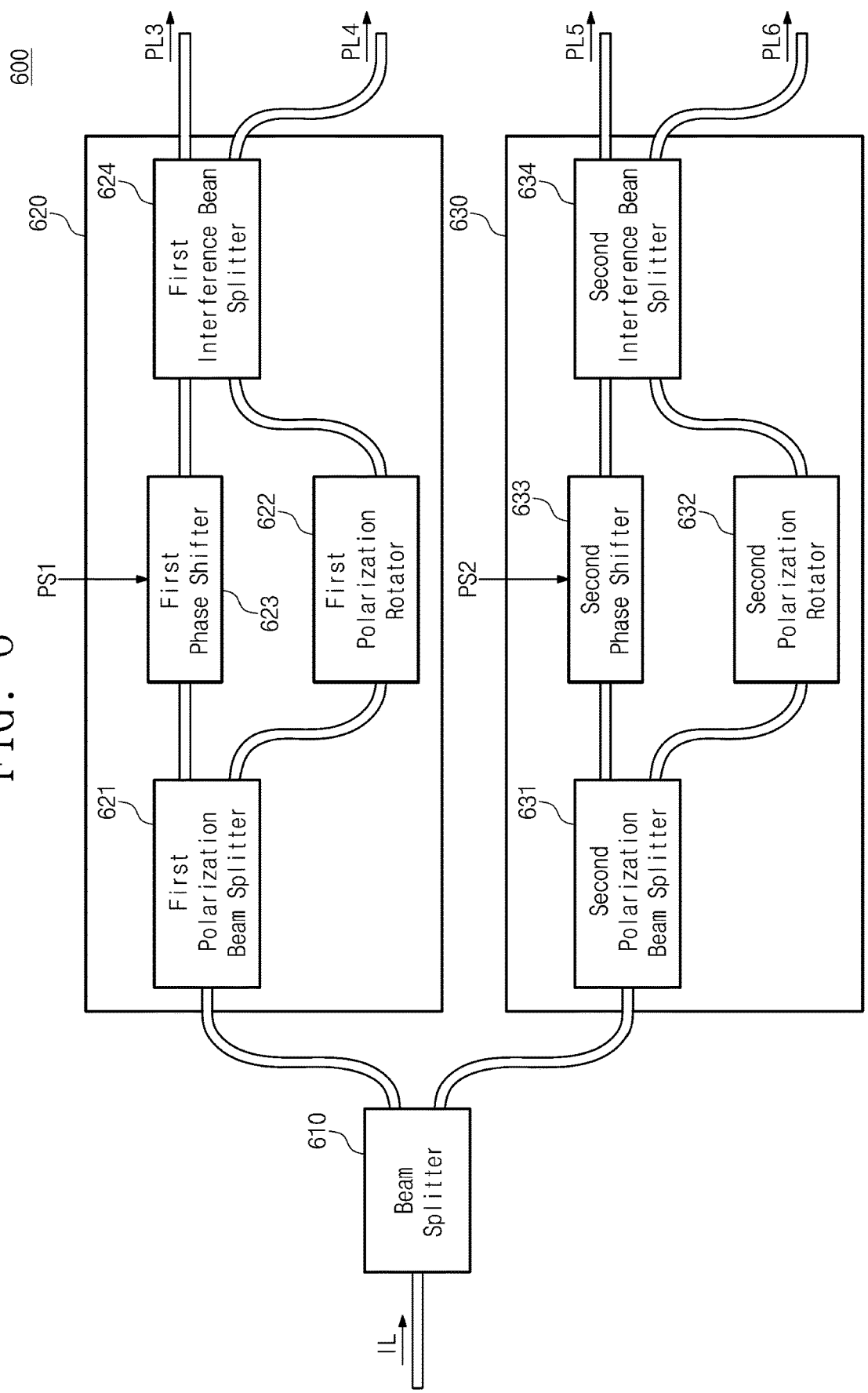
FIG. 6 is a view illustrating a polarization decomposition device for splitting four different polarization directions according to another embodiment of the inventive concept.

FIG. 6 is a view illustrating a polarization decomposition device for splitting four different polarization directions according to another embodiment of the inventive concept. Referring to FIG. 6, a polarization decomposition device 600 includes a beam splitter 610, a first polarized light splitting unit 620, and a second polarized light splitting unit 630. The polarization decomposition device 600 may split the optical signal IL into different first to fourth polarized lights PL1 to PL4. The beam splitter 610 may split the optical signal IL into a first optical signal and a second optical signal as in the beam splitter 511 of FIG. 5. The first optical signal propagates to a first polarized light splitting unit 620 and the second optical signal propagates to a second polarized light splitting unit 630.

The first polarized light splitting unit 620 includes a first polarization beam splitter 621, a first polarization rotator 622, a first phase shifter 623, and a first interference beam splitter 624. The first polarization beam splitter 621, the first polarization rotator 622, the first phase shifter 623, and the first interference splitter 624 may have substantially the same configuration as the second polarization beam splitter 513, the polarization rotator 520, the phase shifter 530, and the interference beam splitter 540 of FIG. 5. For example, the first polarized light splitting unit 620 may split a first optical signal having a polarization direction of −45 degrees and 45 degrees into a third polarized light PL3 and a fourth polarized light PL4.

The second polarized light splitting unit 630 includes a second polarization beam splitter 631, a second polarization rotator 632, a second phase shifter 633, and a second interference beam splitter 634. The second polarization beam splitter 631, the second polarization rotator 632, the second phase shifter 633, and the second interference splitter 634 may have substantially the same configuration as the second polarization beam splitter 513, the polarization rotator 520, the phase shifter 530, and the interference beam splitter 540 of FIG. 5. For example, the second polarized light splitting unit 630 may split the second optical signal having the left circular polarized light and the right circular polarization directions into the fifth polarized light PL5 and the sixth polarized light PL6.

The polarization directions of the optical signals IL that may be split into the third to sixth polarized lights PL3 to PL6 may be determined by the first phase shifter 623 and the second phase shifter 633, respectively. As described with reference to FIG. 3, when the first polarized light splitting unit 620 splits the inputted first optical signal in the −45 degree and 45 degree polarization directions, the first phase shifter 623 may delay the phase so that the phase difference of the two polarized lights inputted to the first interference beam splitter 624 is 90 degrees (or −90 degrees). Also, when the second polarized light splitting unit 630 splits the inputted optical signals into the left circular polarization direction and the right circular polarization direction, the second phase shifter 633 may delay the phase so that the phase difference between the two polarized beams inputted to the second interference beam splitter 634 is 90 degrees (or −90 degrees).

Unlike what is shown in FIG. 6, when the first polarized light splitting unit 620 splits the first optical signal in the −45 degree and 45 degree polarization directions, and when the first polarized light splitting unit 620 is designed so that the phase difference between the two polarized lights inputted to the first interference beam splitter 624 is 90 degrees (or −90 degrees) using the length of the waveguide, the first phase shifter 623 may not be included in the first polarized light splitting unit 620. Also, when the second polarized light splitting unit 630 splits the second optical signal in the left circular polarization direction and the right circular polarization direction, and when the second polarized light splitting unit 630 is designed such that the phase difference between the two polarized lights input to the second interference beam splitter 634 is 90 degrees (or −90 degrees) using the length of the waveguide, the second phase shifter 633 may not be included in the second polarized light splitting unit 630.

The two polarized lights of the first base orthogonal to each other may be split into the third polarized light PL3 and the fourth polarized light PL4 and the two polarized lights of the second base orthogonal to each other may be split into the fifth polarized light PL5 and the sixth polarized light PL6. Like FIG. 5, wince the polarization decomposition device 600 does not split polarized light using a wave plate, the loss due to the polarized light splitting may be minimized, and the optical waveguide may be implemented on the basis of the optical alignment, which may be miniaturized and integrated. Also, only the specific polarization directions are not split into the third to sixth polarized lights PL3 to PL6 using the first and second phase delay signals PS1 and PS2, and may adjust various polarized lights to be split.

The polarization decomposition device 600 may combine the third to sixth polarized lights PL3 to PL6 into the optical signal IL. The first polarized light splitting unit 620 combines the third polarized light PL3 and the fourth polarized light PL4 into the first optical signal. The second polarized light splitting unit 630 combines the fifth polarized light PL5 and the sixth polarized light PL6 into the second optical signal. The beam splitter 610 may combine the first and second optical signals into the optical signal IL.

The polarization decomposition device according to an embodiment of the inventive concept may be miniaturized or integrated using phase delay, polarized light rotation, and optical interference, and may ensure ease of fabrication and stability of operation. Also, a polarization decomposition device according to an embodiment of the inventive concept may split or combine various polarization directions of an optical signal.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:

1. A polarization decomposition device comprising:
   a polarization beam splitter configured to split an optical signal into a first polarized light having a first polarization direction and a second polarized light having a second polarization direction different from the first polarization direction;
   a phase shifter configured to delay a phase of the first polarized light;
   a polarization rotator configured to rotate the second polarized light so that the polarization direction of the second polarized light is changed; and
   an interference beam splitter configured to split the first polarized light in which the phase is delayed and the second polarized light in which the polarization direction is rotated into a third polarized light and a fourth polarized light, split the optical signal having a third polarization direction which is different from at least part of the first and second polarization directions into the third polarized light, and split the optical signal having a fourth polarization direction different from the third polarization direction into the fourth polarized light, and
   wherein the polarization rotator configured to rotate the second polarized light so that the polarization direction of the second polarized light is changed from the second polarization direction to the first polarization direction.

2. The polarization decomposition device of claim 1, wherein the first polarization direction and the second polarization direction are orthogonal to each other.

3. The polarization decomposition device of claim 1, wherein the phase shifter determines a delayed phase angle of the first polarized light based on a phase delay signal.

4. The polarization decomposition device of claim 3, wherein the interference beam splitter splits the first polarized light and the second polarized light into the third polarized light and the fourth polarized light based on the phase angle.

5. The polarization decomposition device of claim 1, wherein the third polarization direction and the fourth polarization direction are orthogonal to each other.

6. The polarization decomposition device of claim 1, wherein the third polarization direction is 45 degrees in a clockwise direction from the first polarization direction with respect to a propagation direction of the first polarized light, and the fourth polarization direction is 45 degrees in a counterclockwise direction from the first polarization direction with respect to a propagation direction of the first polarized light.

7. The polarization decomposition device of claim 1, wherein the third polarization direction rotates clockwise with respect to a propagation direction of the first polarized light and the fourth polarization direction rotates counterclockwise with respect to a propagation direction of the first polarized light.

8. The polarization decomposition device of claim 1, wherein the interference beam splitter is further configured to split the third polarized light and the fourth polarized light into a fifth polarized light and a sixth polarized light having the same polarization direction and having different phases,
   wherein the phase shifter is further configured to delay a phase of a selected one of the fifth polarized light and the sixth polarized light,
   wherein the polarization rotator is further configured to rotate a selected one of the fifth polarized light and the sixth polarized light, and wherein the polarization beam splitter is further configured to combine the fifth polarized light and the sixth polarized light into the optical signal.

9. The polarization decomposition device of claim 1, wherein the interference beam splitter splits the first polarized light and the second polarized light into the third polarized light and the fourth polarized light based on a polarization direction of the optical signal.

10. The polarization decomposition device of claim 1, wherein the polarization beam splitter splits the optical signal into the first polarized light and the second polarized light based on a polarization direction of the optical signal.

11. A polarization decomposition device comprising:
a polarization beam splitter configured to split an optical signal into one or both of a first polarized light having a first polarization direction and a second polarized light having a second polarization direction different from the first polarization direction;
a phase shifter configured to delay a phase of the second polarized light;
a polarization rotator configured to rotate the second polarized light so that the polarization direction of the second polarized light is changed; and
an interference beam splitter configured to split the first polarized light and the second polarized light in which the phase is delayed and the polarization direction is rotated into a third polarized light and a fourth polarized light, split the optical signal having a third polarization direction which is different from at least part of the first and second polarization directions into the third polarized light, and split the optical signal having a fourth polarization direction different from the third polarization direction into the fourth polarized light, and
wherein the polarization rotator configured to rotate the second polarized light so that the polarization direction of the second polarized light is changed from the second polarization direction to the first polarization direction.

12. The polarization decomposition device of claim 11, wherein the phase shifter delays the phase of the second polarized light in which the polarization direction is rotated.

13. The polarization decomposition device of claim 11, wherein the polarization rotator rotates the second polarized light in which the phase is delayed.

14. A polarization decomposition device comprising:
a beam splitter unit configured to split an optical signal into a first polarized light having a first polarization direction, a second polarized light having a second polarization direction different from the first polarization direction, a first split polarized light having the first polarization direction, and a second split polarized light having the second polarization direction;
a phase shifter configured to delay a phase of the first split polarized light or the second split polarized light;
a polarization rotator configured to rotate the first split polarized light or the second split polarized light so that a polarization direction of the first split polarized light or the second split polarized light is changed; and
an interference beam splitter configured to split the first split polarized light and the second split polarized light in which the phase is delayed, the polarization direction is rotated, or both, into a third polarized light and a fourth polarized light, split the optical signal having a third polarization direction which is different from at least part of the first and second polarization directions into the third polarized light, and split the optical signal having a fourth polarization direction different from the third polarization direction into the fourth polarized light, and
wherein the polarization rotator configured to:
rotate the first split polarized light so that a polarization direction of the first split polarized light is changed from the first polarization direction to the second polarization direction; or
rotate the second split polarized light so that a polarization direction of the second split polarized light is changed from the second polarization direction to the first polarization direction.

15. The polarization decomposition device of claim 14, wherein the beam splitter unit comprises:
a beam splitter configured to split the optical signal into a first optical signal and a second optical signal;
a first polarization beam splitter configured to split the first optical signal into the first polarized light and the second polarized light having different polarization directions; and
a second polarization beam splitter configured to split the second optical signal into the first split polarized light and the second split polarized light having different polarization directions.

16. The polarization decomposition device of claim 14,
a second phase shifter configured to delay a phase of the first polarized light or the second polarized light;
a second polarization rotator configured to rotate the first polarized light or the second polarized light so that the polarization direction of the first polarized light or the second polarized light is changed; and
an second interference beam splitter configured to split the first polarized light and the second polarized light in which the phase is delayed, the polarization direction is rotated, or both, into a fifth polarized light and a sixth polarized light, split the optical signal having a fifth polarization direction which is different from at least part of the first and second polarization directions into the fifth polarized light, and split the optical signal having a sixth polarization direction different from the fifth polarization direction into the fourth polarized light.

17. The polarization decomposition device of claim 16, wherein a second angle between a third selected direction of the third polarization direction and the fourth polarization direction and a fourth selected direction of the fifth polarization direction and the sixth polarization direction is 90 degrees on a Poincare sphere.

18. The polarization decomposition device of claim 16, wherein the third polarization direction is −45 degrees and the fourth polarization direction is 45 degrees, and
wherein the fifth polarization direction is a direction rotating clockwise and the sixth polarization direction is a direction rotating counterclockwise.

19. The polarization decomposition device of claim 14, wherein the phase shifter delays the phase of the first split polarized light,
wherein the polarization rotator rotates the second split polarized light,
wherein the interference beam splitter splits the first split polarized light in which the phase is delayed and the second split polarized light in which the polarization direction is rotated into the third polarized light and the fourth polarized light.

20. The polarization decomposition device of claim 14, wherein the polarization rotator rotates the second split polarized light, wherein the phase shifter delays the phase of the second split polarized light, wherein the interference beam splitter splits the first split polarized light and the second split polarized light in which the polarized light is rotated and the phase is delayed into the third polarized light and the fourth polarized light.

21. The polarization decomposition device of claim 14, wherein a first angle between a first selected direction of the first polarization direction and the second polarization direction and a second selected direction of the third polarization direction and the fourth polarization direction is 90 degrees on a Poincare sphere.

22. The polarization decomposition device of claim 14, wherein the first polarization direction is 0 degree and the second polarization direction is 90 degrees, and wherein the third polarization direction and the fourth polarization direction are respectively:

−45 degrees and 45 degrees; or a direction rotating clockwise and a direction rotating counterclockwise.

\* \* \* \* \*